United States Patent
Siefert et al.

(10) Patent No.: US 8,920,526 B1
(45) Date of Patent: Dec. 30, 2014

(54) PRODUCTION OF METHANE-RICH SYNGAS FROM HYDROCARBON FUELS USING MULTI-FUNCTIONAL CATALYST/CAPTURE AGENT

(75) Inventors: Nicholas S. Siefert, Homestead, PA (US); Dushyant Shekhawat, Morgantown, WV (US); David A. Berry, Morgantown, WV (US); Wayne A. Surdoval, Monroeville, PA (US)

(73) Assignee: U.S. Department Of Energy, Washington, DC (US)

(*) Notice: Subject to any disclaimer, the term of this patent is extended or adjusted under 35 U.S.C. 154(b) by 764 days.

(21) Appl. No.: 13/232,018

(22) Filed: Sep. 14, 2011

(51) Int. Cl.
*C01B 3/36* (2006.01)

(52) U.S. Cl.
USPC ....................................................... 48/197 R

(58) Field of Classification Search
CPC ........ C01B 3/061; C01B 3/063; C01B 3/065; C01B 3/10; C01B 3/105; C01B 3/20; C01B 3/08; C01B 2203/1241; C07C 9/04
See application file for complete search history.

(56) References Cited

U.S. PATENT DOCUMENTS

| | | | |
|---|---|---|---|
| 3,786,138 A | | 1/1974 | Shalit et al. |
| 3,852,188 A | * | 12/1974 | Dugan et al. ................. 208/114 |
| 3,862,025 A | * | 1/1975 | Steele et al. ................. 208/109 |
| 2007/0060659 A1 | * | 3/2007 | Kindig et al. ................. 518/703 |
| 2009/0259076 A1 | * | 10/2009 | Simmons et al. ............. 568/671 |
| 2009/0259080 A1 | * | 10/2009 | Raman et al. ..................... 585/3 |
| 2013/0248768 A1 | * | 9/2013 | Zachar .......................... 252/373 |

OTHER PUBLICATIONS

Kamo et al., "Production of hydrogen by steam gasification of dehydrochlorinated poly(vinyl chloride) or activated carbon in the presence of various alkali compounds," J Mater Cycles Waste Manag 8 (2006).

* cited by examiner

*Primary Examiner* — Imran Akram
(74) *Attorney, Agent, or Firm* — James B. Potts; Brian J. Lally; John T. Lucas

(57) ABSTRACT

The disclosure provides a gasification process for the production of a methane-rich syngas at temperatures exceeding 700° C. through the use of an alkali hydroxide MOH, using a gasification mixture comprised of at least 0.25 moles and less than 2 moles of water for each mole of carbon, and at least 0.15 moles and less than 2 moles of alkali hydroxide MOH for each mole of carbon. These relative amounts allow the production of a methane-rich syngas at temperatures exceeding 700° C. by enabling a series of reactions which generate $H_2$ and $CH_4$, and mitigate the reforming of methane. The process provides a methane-rich syngas comprised of roughly 20% (dry molar percentage) $CH_4$ at temperatures above 700° C., and may effectively operate within an IGFC cycle at reactor temperatures between 700-900° C. and pressures in excess of 10 atmospheres.

18 Claims, 4 Drawing Sheets

PRODUCTION OF METHANE-RICH SYNGAS FROM HYDROCARBON FUELS USING MULTI-FUNCTIONAL CATALYST/CAPTURE AGENT

GOVERNMENT INTERESTS

The United States Government has rights in this invention pursuant to the employer-employee relationship of the Government to the inventors as U.S. Department of Energy employees and site-support contractors at the National Energy Technology Laboratory.

FIELD OF THE INVENTION

The disclosure relates to a gasification process for a carbonaceous fuel for the production of a methane-rich syngas at molten bed temperatures exceeding 700° C. through the use of an alkali hydroxide MOH, where M is an alkali cation of K, Na, Li, or a mixture thereof, using a gasification mixture comprised of at least 0.25 moles and less than 2 moles of water for each mole of carbon, and at least 0.15 moles and less than 2 moles of alkali hydroxide MOH for each mole of carbon. The process provides a methane-rich syngas comprised of roughly 20% (dry molar percentage) $CH_4$ at temperatures above 700° C., and may effectively operate within an IGFC cycle, or IGCC cycle, at molten bed temperatures between 700-900° C. and pressures in excess of 10 atmospheres.

BACKGROUND

Gasification is a process that converts organic or fossil based carbonaceous materials into carbon monoxide, hydrogen, carbon dioxide and methane. This is achieved by reacting the material at high temperatures without combustion, with a controlled amount of oxygen and/or steam, to generate a resulting gas mixture of $H_2$ and CO called syngas. Syngas is combustible and often used as a fuel or as an intermediate for the production of other chemicals such as methane, methanol, synthetic diesel and dimethyl ether in catalytic processes.

A significant use of syngas is as a fuel for fuel cells, which utilize hydrogen and oxygen to produce direct current electricity. In addition to electricity, fuel cells produce water, carbon dioxide, heat and, depending on the fuel source, very small amounts of nitrogen dioxide and other emissions. The energy efficiency of a fuel cell is generally between 40-60%, or up to 85% efficient if waste heat is captured for use. Additionally, because fuel cells generate electricity while keeping the fuel and air separated, the $CO_2$ generated in the anode of the fuel cell is not diluted with nitrogen, making ~100% capture of CO2 within the system both technically and economically viable. Fuel cells therefore hold great promise in efforts toward reducing $CO_2$ emissions, even when the fuel source is coal.

A Solid Oxide Fuel Cell (SOFC) is a specific type of fuel cell which offers particular advantage. SOFCs use a solid material, typically yttria-stabilized zirconia, as the electrolyte, and the solid material construction allows geometries outside of the flat plane configurations of other types of fuel cells. The SOFC operates at very high temperatures, typically between 500 and 1000 degrees Celsius (° C.), and are capable of internally reforming light hydrocarbons such as methane, propane and butane. As a result, SOFCs can be run on a variety of fuels other than pure hydrogen gas, provided the fuel selected contains hydrogen atoms. The high SOFC temperatures also incur other advantages, such as: a) the ability to incorporate bottoming cycles to generate further power from high temperature exhaust stream, b) the capability to water-gas-shift CO into $H_2$ fuel, c) the capability to steam reform hydrocarbons into $H_2$ and CO, and d) the capability to catalyze the electrochemical reactions using non-noble metals, thus eliminating the need for expensive electro-catalysts, such as platinum. A primary disadvantage in SOFC operation is the necessary cooling load of the fuel cell due to the exothermic electro-chemical reaction between hydrogen and oxygen ions. In terms of overall system efficiency, the parasitic cooling load typically manifests as compressive and pumping power cost expended for supply of cooling air flow. A reduction in cooling requirements therefore has direct improvement on the operating efficiency of the SOFC.

One method of reducing SOFC cooling requirements is to use the internal reforming capabilities of the electrocatalysts engendered by the high operating temperatures. Endothermic reforming of hydrocarbons such as $CH_4$ can serve as an effective heat sink to the exothermic $H_2$ oxidation within the fuel cell, and significantly reduce stack thermal management load. As a result, use of a methane-rich syngas as an SOFC fuel carries distinct advantages. However, generation of a methane-rich syngas through gasification has been problematic at the typical SOFC operating temperatures, temperatures above 700° C., because of rapid methane reforming and oxidation in typical coal gasifiers. Correspondingly, the realizable efficiency of combined cycle concepts such as the Integrated Gasification Fuel Cell (IGFC) have suffered. In order to achieve high IGFC efficiencies, it is desirable that the gasification process and the SOFC operation occur at commiserate temperatures, and additionally desirable that the gasification process delivers a methane-rich syngas product, in order to exploit the endothermic reforming reactions discussed above that minimize the amount of coolant or cooling air. See Siefert et al., "Integrating Catalytic Coal Gasifiers With Solid Oxide Fuel Cells," *ASME* 2010 *8th International Fuel Cell Science, Engineering and Technology Conference: Volume* 2 (2010); see also Romano et al., "Integrating IT-SOFC and gasification combined cycle with methanation reactor and hydrogen firing for near zero-emission power generation from coal," *Energy Procedia* 4 (2011), among others. A gasification system capable of generating a methane-rich syngas at the high operating temperatures of an SOFC would provide distinct advantage. The advantage of a methane-rich syngas would additionally accrue to the gasification operation itself, since methanation is a highly exothermic reaction and can be utilized to supply all or a large portion of the energy required for the endothermic steam-coal reactions, and greatly mitigate the need for oxygen, and hence greatly mitigates the need for supporting air separation units in gasification operations. In addition, since higher temperatures means faster steam-gasification kinetics, then higher reactor temperatures imply smaller reactor sizes per unit of syngas exiting the reactor. The trade-off is between higher kinetics for steam-gasification and eventual steam-reforming of the methane. The optimal temperature of the reactor is between 700° C. and 900° C.

It is also understood that the reactivity of carbonaceous materials such as graphite and coal char towards $CO_2$ and steam is strongly enhanced by the presence of alkali metal salts such as $Li_2CO_3$, $Na_2CO_3$, and $K_2CO_3$. See e.g., Sheth et al., "Catalytic gasification of coal using eutectic salts: reaction kinetics with binary and ternary eutectic catalysts," *Fuel* 82 (2003), among others. The exact role that the salts play in these processes is not completely understood, however whatever the detailed mechanism of the catalytic process is, the overall rate of gasification is enhanced through contact between the alkali metal catalyst and the carbon. Generally, molten catalyst salts are better able to penetrate the coal structure and, hence, improve accessibility of the unavailable carbon sites in the interior of the coal/char. Similarly, the alkali hydroxide catalysts KOH and NaOH have been utilized in catalytic gasifications. See e.g., U.S. Pat. No. 3,786,138 to Shalit et al.; see also Kamo et al., "Production of hydrogen by steam gasification of dehydrochlorinated poly(vinyl chloride) or activated carbon in the presence of various alkali compounds," *J Mater Cycles Waste Manag* 8 (2006). The hydroxide catalysts are generally used in stoichiometric excess to $CO_2$ generated during the gasification process, in order to absorb $CO_2$ and drive the water-gas shift reaction in the gasifier toward exclusive $H_2$ production, and additionally utilize relatively large amounts of $H_2O$ for the additional production of $H_2$. These molar relations fail to realize production of a methane-rich syngas at the typical SOFC temperatures of 700-900° C. It would be advantageous to provide a gasification process whereby catalytic gasification using an alkali metal catalyst could generate a methane-rich syngas within the SOFC operating temperature range. It would provide further advantage if the catalyst were an alkali hydroxide, so that a substantial amount of $CO_2$ generated as a result of the gasifier process could be captured within the reactor. The exothermic capture reactions, along with the exothermic methanation reactions, mean that the gasifier can be operated without any input of oxygen or external heating. Additionally, by eliminating the requirement for oxygen to maintain the temperature of the reactor, a larger amount of methane can be generated in the gasifier.

These and other objects, aspects, and advantages of the present disclosure will become better understood with reference to the accompanying description and claims.

SUMMARY

The disclosure provides a gasification process for the production of a methane-rich syngas at temperatures exceeding 700° C. through the use of an alkali hydroxide MOH using a gasification mixture comprised of at least 0.25 moles and less than 2 moles of water for each mole of carbon, and at least 0.15 moles and less than 2 moles of alkali hydroxide MOH for each mole of carbon. Preferably, the gasification mixture is comprised of at least 0.5 moles and less than 1.5 moles of alkali hydroxide MOH for each mole of carbon. These relative amounts allow the production of a methane-rich syngas at temperatures exceeding 700° C. by enabling a series of reactions which generate $H_2$ and $CH_4$, and mitigate the steam-reforming of methane. The particular molar relationship of the gasification mixture prevents the alkali hydroxide MOH from capturing all gaseous carbon species. If not enough alkali hydroxide catalyst is used, then the process requires the input of oxygen, which can oxidize methane. If too much alkali hydroxide is used, then the methane and higher hydrocarbons are steam-reformed, and there isn't enough hydrocarbons in the syngas to provide cooling downstream in the SOFC. If not enough water is used, then the initial steam-coal gasification reaction cannot proceed. If too much water is used, then the methane and higher hydrocarbons are reformed, and there isn't enough hydrocarbons in the syngas to provide cooling downstream in the SOFC The carbonaceous fuel is a fuel or gasifiable material which contains carbon in an elemental or chemically combined form. The alkali hydroxide MOH and subsequently formed alkali carbonate $M_2CO_3$ act to catalyze the carbon-steam reaction, generating CO and $H_2$. The water gas shift reaches equilibrium rapidly at the gasification temperature, and acts to balance the concentrations of CO, $H_2O$, $CO_2$, and $H_2$, in conjunction with methanation reactions. The alkali hydroxide MOH in the molten state acts to remove to some portion of $CO_2$ and form molten alkali carbonate $M_2CO_3$, however, the molar relations of the gasification mixture limit the alkali hydroxide MOH and $H_2O$ actions maintain a concentration of C and $H_2O$ such that reverse methanation is greatly mitigated. In certain embodiments, the specified molar relations of carbon, alkali hydroxide MOH, and $H_2O$ generate a methane-rich syngas comprised of roughly 20% (dry molar percentage) $CH_4$ while operating above 700° C.

The alkaline hydroxide MOH may be comprised of potassium hydroxide (KOH), sodium hydroxide (NaOH), lithium hydroxide (LiOH), or mixtures thereof. In an embodiment, the alkali hydroxide MOH is comprised of at least 5 mol % KOH. The $KOH/K_2CO_3$ acts as a catalyst for the carbon-steam reaction as well as catalyzing the production of methane. In another embodiment, the alkali hydroxide MOH is comprised of equimolar amounts of KOH, NaOH, and LiOH. The equimolar KOH—NaOH—LiOH acts to provide the alkali metal cation M while establishing a eutectic mixture of carbonates which exist in the molten state at gasification temperatures generally between 700 and 900° C. The alkali hydroxide MOH may additionally act to mitigate the concentration of additional gases created through the volatization and gasification of the carbonaceous fuel, such as the mitigation of $H_2S$ or HCl through the formation of $M_2S$ or MCl, reducing the necessity for subsequent gas clean-up operations.

The gasification process disclosed effectively operates within an IGFC cycle, or an IGCC cycle if 100% $CO_2$ capture is not required. The IGFC cycle is enhanced by operation with methane-rich syngas by the methane reforming which occurs within the operating temperature and pressure conditions of the SOFC, reducing the burden on parasitic heat removal process associated with maintaining the operating temperature of the SOFC. An additional advantage of the process is the generation of the methane-rich syngas at elevated pressures, which significantly aids integration into an IGFC, where the SOFC may operate at pressures in excess of 5 atmospheres.

Embodiments of the gasification process disclosed are further demonstrated and described in the following description.

DETAILED DESCRIPTION

The following description is provided to enable any person skilled in the art to use the invention and sets forth the best mode contemplated by the inventor for carrying out the invention. Various modifications, however, will remain readily apparent to those skilled in the art, since the principles of the present invention are defined herein a method for the production of a methane-rich syngas using a gasification mixture comprised of a carbonaceous fuel, an alkali hydroxide MOH, and steam, where the gasification mixture is comprised of at least 0.25 moles and less than 2 moles of water for each mole of carbon, and at least 0.15 moles and less than 2 moles of alkali hydroxide MOH for each mole of carbon. Preferably, the gasification mixture is comprised of at least 0.5 moles and less than 1.5 moles of alkali hydroxide MOH for each mole of carbon.

The gasification mixture is comprised of specified relative amounts of the carbonaceous fuel, the alkali hydroxide MOH, and the $H_2O$. These relative amounts allow the production of a methane-rich syngas at molten bed temperatures exceeding 700° C. by enabling a series of reactions which generate $H_2$ and $CH_4$, and mitigate the reforming of methane. The particular molar relationship of the gasification mixture prevents the alkali hydroxide MOH from continuously removing $CO_2$, and maintains a concentration of CO and $H_2O$ within the gasification gases. Additionally, the molar relationship provides sufficient $H_2O$ for the production of CO and $H_2$ through a carbon-steam reaction while limiting the $H_2O$ available for the destruction of $CH_4$ through reforming in the gasifier.

The alkali hydroxide MOH forms an alkali carbonate $M_2CO_3$ during the gasification process. The alkali hydroxide MOH and alkali carbonate $M_2CO_3$ catalyzes the carbon-steam reaction in the gasifier, and remains in a molten phase throughout the process as the gasifier is maintained at a gasification temperature exceeding 700° C. The alkali hydroxide may be a mixture of KOH, NaOH, and LiOH in order to generate a favorable molten temperature based on the temperature and pressure of the gasification process. Other alkali species, such as rubidium or cesium are equally technically qualified. The alkali carbonate $M_2CO_3$ is typically comprised of $K_2CO3$, $Na_2CO3$, and $Li_2CO3$, and depends on the composition of the alkali hydroxide utilized. Maintaining the alkali hydroxide MOH and alkali carbonate $M_2CO_3$ in molten phase improves the kinetics and allows for separation of the molten $M_2CO_3$ and the methane-rich syngas through buoyancy and gravity effects.

Figure 1:
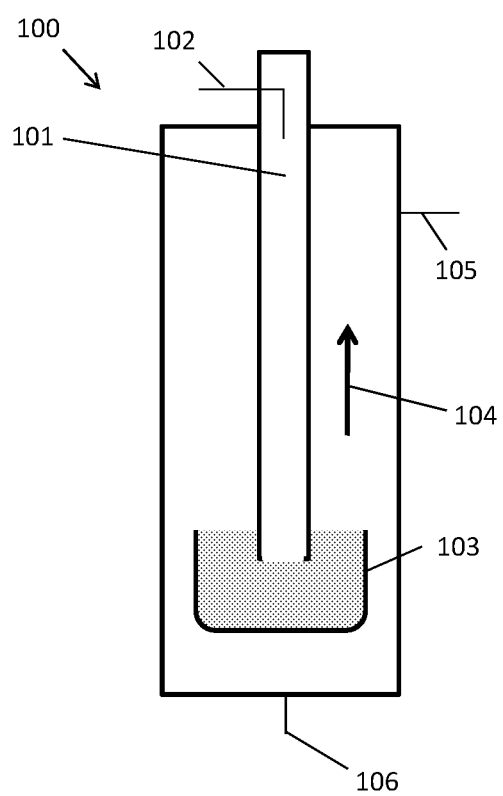
FIG. 1 illustrates a gasification process using the gasification mixture.

At FIG. 1, gasifier 100 having gasification zone 101 is maintained at a gasification temperature of at least 700° C. In an embodiment, the gasification temperature is between 700-900° C., and the gasification pressure is greater than 10 atmospheres, preferably 20 atmospheres or greater. Gasification zone 101 contains a gasification mixture of a carbonaceous fuel, $H_2O$, and an alkali hydroxide MOH, where M is the alkali metal cation K, Na, Li, or mixtures thereof. At the gasification temperature and gasification pressure within gasification zone 101, the $H_2O$ is present as steam. Additionally, the alkali hydroxide MOH exists in a molten state, and alkali carbonates $M_2CO_3$ exist in a molten state. The formation of $M_2CO_3$ from the alkali hydroxide MOH is expected during the gasification operation within gasification zone 101, as will be discussed infra.

The gasification mixture is comprised of relative amounts of the carbonaceous fuel, the alkali hydroxide MOH, and the $H_2O$ such that for each mole of carbon, there is at least 0.15 and less than 2 moles of alkali hydroxide MOH, and at least 0.25 and less than 2 moles of $H_2O$. Preferably, the gasification mixture is comprised of at least 0.5 moles and less than 1.5 moles of alkali hydroxide MOH for each mole of carbon. These relative amounts allows the production of a methane-rich syngas within gasification zone 101 at the conditions specified by enabling a series of reactions which generate $H_2$ and $CH_4$, and mitigate the reforming of methane, while balancing available $CO_2$ capture and water-gas shift such that methane-rich syngas produced includes a relative minimum of CO and $CO_2$.

The carbonaceous fuel is a fuel or gasifiable material which contains carbon in an elemental or chemically combined form. As used here, the term carbonaceous fuel encompasses carbohydrates, coal and hydrocarbon materials, including organic polymers. The carbonaceous fuel may be mixed and/or chemically combined with, for example, halogens, sulfur, nitrogen or other chemical entities, and may occur naturally or may be man-made, and may be solid, liquid or gas at ambient temperatures. Exemplary carbonaceous fuels include coal, cellulosic materials (biomass), hydrocarbon fuels, municipal, chemical and refining wastes, and the like. In a particular embodiment, the carbonaceous fuel is coal. The carbonaceous fuel will typically be present in the gasification mixture as a plurality of particles having an average size as defined by mesh number or another measurement standard known in the art. High-volatile wastes and coals are a preferred fuel for the production of the methane-rich syngas, since methane and ethane will issue from the coal during pyrolysis, and the conditions established within gasification zone 101 will greatly mitigate any methane reforming or methane oxidizing reactions which would otherwise be expected under a typical gasification operation.

The alkali hydroxide MOH is a chemical compound comprised of an alkali metal cation $M^+$ and the hydroxide anion $OH^-$, where the alkali metal cation is $K^+$, $Na^+$, $Li^+$, or mixtures thereof. In an embodiment, the alkali hydroxide MOH is comprised of KOH, NaOH, and LiOH in an equimolar ratio of 1:1:1 respectively. However, the specific composition of the alkali hydroxide MOH is not limiting within this disclosure, provided that the alkali hydroxide MOH of KOH, NaOH, LiOH, RbOH, CsOH, or the mixture thereof is present such that there is at least 0.15 and less than 2 moles of alkali hydroxide MOH per mole of carbon in the gasification mixture, and such that at the gasification temperature within gasification zone 101, the alkali hydroxide MOH and an alkali carbonate $M_2CO_3$ exist in a molten state. Correspondingly, the specific relative proportions of KOH, NaOH, and LiOH utilized in order to generate the necessary molar relation between carbon and the alkali hydroxide MOH may be formulated based on the eutectics of the resulting mixture, such that the alkali hydroxide MOH and the subsequent alkali carbonate $M_2CO_3$ exist in the molten state at the gasification temperature within gasification zone 101.

At FIG. 1, and generally speaking, within gasification zone 101, at the gasification temperature and gasification pressure, a gasification mixture as disclosed here is expected to proceed through relatively sequential stages of drying, devolatilization, and the gasification of resulting char. Devolatilization is expected to generate the solid char, various gaseous products such as $H_2O$, CO, $CO_2$, $CH_4$, $H_2$, $H_2S$, COS and others, and an organic residue of tar. See e.g., Higman et al., *Gasification*, Elsevier Science (USA) (2003). Additionally, primary and secondary fragmentation of the carbonaceous fuel particles may occur. See e.g., Ammendola et al., "Devolatilization and Attrition Behavior of Fuel Pellets during Fluidized-Bed Gasification," *Energy Fuels,* 25 (3) (2011). Subsequent gasification of the char is typically significantly slower than devolatization, however depending on heating rate, fuel particle size, and other factors, devolatization and char gasification may proceed somewhat concurrently.

With respect to the process disclosed here, the carbonaceous fuel undergoes drying and devolatilization while subject to a gasification temperature of 700° C. or greater, preferably 700-900° C. The char gasification generates the following representative reactions:

$$C+H_2O \rightarrow CO+H_2 \quad (1)$$

$$CO + H_2O \leftrightarrow CO_2 + H_2 \quad (2)$$

$$CO + 3H_2 \leftrightarrow CH_4 + H_2O \quad (3)$$

$$CO_2 + 2MOH \rightarrow M_2CO_3 + H_2O \quad (4)$$

As is understood, reactions occurring during char gasification are complex and are expected to encompass additional reactions beyond the representative reactions (1) through (4) listed above, however speaking generally and without being bound by theory, reactions (1) through (4) act in the conditions of gasification zone 101 and the molar relations of the gasification mixture to generate the methane-rich syngas. In addition to the input of coal, water and alkali hydroxides, it may be beneficial to add non-reacting species, such as alkali chlorides and sulfides, to lower the melting point of the molten species inside the gasifier, which lowers the viscosity of the molten bed and improves the removal of the molten material from the gasifier.

The alkali hydroxide MOH and subsequently formed alkali carbonate $M_2CO_3$ act to catalyze the carbon-steam reaction of reaction (1), generating CO and $H_2$. The reversible gas phase water gas shift of reaction (2) reaches equilibrium rapidly at the gasification temperature, and acts to balance the concentrations of CO, $H_2O$, $CO_2$, and $H_2$. The reversible methanation of reaction (3) additionally occurs to establish an equilibrium between CO, $H_2$, $CH_4$, and $H_2O$.

The alkali hydroxide MOH in the molten state acts to remove to some portion of $CO_2$ and form molten alkali carbonate $M_2CO_3$ via reaction (4), and the rapid acting reaction (2) responds to the decreased $CO_2$ concentration by proceeding in the forward direction to generate additional $CO_2$. With an excess of alkali hydroxide KOH, these actions would be expected to rapidly lock up available carbon in the mixture and result in gasification gases comprised mainly of $H_2$ and extremely limited $CH_4$. See e.g., U.S. Pat. No. 3,786,138 to Shalit, et al, among others. However, within the gasification mixture disclosed here and as discussed infra, this alkali hydroxide MOH action is limited by the composition of the gasification mixture, where for each mole of carbon, there is at least 0.15 and less than 2 moles of alkali hydroxide MOH. This particular molar relationship prevents the alkali hydroxide MOH from continuously removing all $CO_2$, and maintains a concentration of CO and $H_2O$ within the gasification gases to counter the reverse methanation reaction.

Additionally, the alkali hydroxide MOH and alkali carbonate $M_2CO_3$ serves as a catalyst for the carbon-steam reaction of reaction (1), and may additionally catalyze the methanation reaction (3).

As is understood, the alkali hydroxide MOH may additionally act to mitigate the concentration of additional gases created through the volatization and gasification of the carbonaceous fuel, such as the mitigation of $H_2S$ and HCl through the formation of $M_2S$ and MCl, and may additionally react with other compounds incidentally present during the process, such as $Al_xSi_yO_z$.

The methanation reaction (3) is a reversible reaction and may proceed in the forward direction for the generation of $CH_4$ and $H_2O$, or may generate methane reforming by proceeding in the reverse direction, generating CO and $H_2$. The reverse methane reforming reaction is endothermic and can have significant impact at temperatures greater than 700° C. when sufficient $H_2O$ inventories are available. However, within the gasification mixture disclosed here and as discussed infra, methane reforming is limited by the composition of the gasification mixture, where for each mole of carbon, there is at least 0.25 and less than 2 moles of $H_2O$ available. This balance provides sufficient $H_2O$ for the production of CO and $H_2$ via reaction (1), while limiting the $H_2O$ available for the destruction of volatized and generated $CH_4$ through the reverse direction of reaction (3). Similarly, limiting the presence of the alkali hydroxide MOH additionally serves to mitigate any methane reforming by limiting the absorption of $CO_2$ and the resulting water-gas shift of reaction (2) to further reduce CO concentrations, and drive the methanation reaction (3) toward CO and $H_2$, destroying available $CH_4$. Additionally, an increased gasification pressure in gasification zone 101 will aid in driving reaction (3) toward the production of $CH_4$ and $H_2O$. Preferably, the gasification pressure is greater than 10 atmospheres, more preferably the gasification pressure is 20 atmospheres or greater.

The process disclosed thereby generates a syngas rich in hydrogen and methane by using a molten bed of alkali hydroxide MOH for the capture of $CO_2$ by generating alkali carbonate $M_2CO_3$. In order to maintain $CH_4$ above roughly 20% (dry molar percentage) while operating above 700° C., a molar ratio of carbon, alkali hydroxide MOH, and $H_2O$ is specified.

In an embodiment, the alkali hydroxide MOH is comprised of at least 5 mol % KOH. The $KOH/K_2CO_3$ acts as a catalyst for the carbon-steam reaction as well as catalyzing the production of methane. In another embodiment, the alkali hydroxide MOH is comprised of equimolar amounts of KOH, NaOH, and LiOH. The equimolar KOH—NaOH—LiOH acts to provide the alkali metal cation M while establishing a eutectic mixture of carbonates which exist in the molten state at gasification temperatures generally around 700° C. In addition, an equal molar mixture of Li, Na, K allows the alkali hydroxides to melt at temperatures below the boiling point of water at 20 atm pressure. Using a eutectic mixture of alkali species simplifies the process of flowing the hydroxides into the gasifier and the process of flowing the carbonates out of the gasifier.

In an embodiment, gasification zone 101 is a co-current gasification zone, where the mixture enters the gasification zone 101 at mixture inlet 102, and the carbonaceous fuel is surrounded by the alkali hydroxide MOH and the $H_2O$. The carbonaceous fuel, alkali hydroxide MOH, and $H_2O$ move generally co-currently from mixture inlet 102 through gasification zone 101 as gasification occurs, and gasification gases and molten carbonate $M_2CO_3$ discharge from the co-current gasification into a separation vessel 103.

Following the gasification process, gasification gases comprised of $H_2$ and $CH_4$ are separated from the alkali carbonate $M_2CO_3$ to generate the methane rich syngas. As specified, within gasification zone 101, the gasification temperature is sufficient to maintain the alkali carbonate $M_2CO_3$ in a molten state. Typically, the gasification temperature is also sufficient to maintain selected incidental products such as $M_2S$ and MCl in the molten state. Separation of the methane-rich syngas and the molten alkali carbonate $M_2CO_3$ may be generated through various gas-liquid separation means known in the art. An exemplary method is illustrated at FIG. 1, where gasification zone 101 is in fluid communication with separation vessel 103. Separation vessel 103 is an open vessel receiving a discharge of gasification gases and molten alkali carbonate $M_2CO_3$ motivated through reaction zone 101 by gravity and pressure effects. The gasification gases and molten alkali carbonate $M_2CO_3$ separate through buoyancy and gravity effects in separation vessel 103, and methane-rich syngas 104 rises and is collected through syngas discharge 105, while the molten alkali carbonate flows out of separation vessel 103 and through alkali carbonate discharge 106. The methane-rich syngas is comprised of $H_2$ and $CH_4$, some amount of CO and $CO_2$, and may also be comprised of other gases generated within the gasification process. Generally, the process as disclosed here produces a methane-rich syngas comprised of greater than 70 mol % $H_2$, greater than 18 mol % $CH_4$, less than 10 mol % CO and $CO_2$, and about 2.5 mol % ethane+ethylene when the carbonaceous fuel is coal. Additionally, the molten alkali carbonate $M_2CO_3$ may be accompanied by various other compounds in both molten and solid phase, such as molten $M_2S$, MCl, or solid compounds such as $M_aAl_xSi_yO_z$.

In another embodiment, the mixture is generated as a slurry of carbonaceous fuel, liquid water, and alkali hydroxide MOH. The slurry is comprised of the respective components in molar quantities equivalent to that specified for the gasification mixture. The slurry then enters gasification zone 101 at mixture inlet 102 through pumping power or some other motive force appropriate for the movement of the solid-liquid slurry, and the slurry is heated to the gasification temperature in gasification zone 101.

In another embodiment, the gasification process disclosed operates within an IGFC cycle and the methane-rich syngas is discharged to the anode of a high temperature fuel cell, such as a pressurized SOFC. Such IGFC cycles are enhanced by operation with methane-rich syngas because methane reforming occurs within the operating temperature and pressure conditions of the SOFC, reducing the burden on parasitic heat removal process associated with the SOFC, such as the compression of SOFC cooling air or the compression a coolant to remove heat from the SOFC. In another embodiment, waste heat or gas or both from the hot anode of the SOFC are recirculated and transferred to the gasification zone 101 in order to maintain the gasification temperature in gasification zone 101 and to increase the efficiency of the overall power plant. An additional advantage of the process disclosed here is the generation of the methane-rich syngas at elevated pressures, which significantly aids with integration into an IGFC, where the SOFC may operate at pressures in excess of 5 atmospheres.

Proof of Principle

In order to measure the kinetics of molten catalytic gasification of coal and to measure the methane composition in the syngas, a molten catalytic reactor was constructed along with associated equipment required for operation of the reactor. The equipment consisted of a pressure vessel with a ceramic crucible at the bottom holding the alkali hydroxide MOH and coal. A tube carrying steam was placed inside of the ceramic crucible, so that steam passed through a molten bed of coal and alkali hydroxide MOH. Syngas exited the reactor and liquids were condensed before going through a pressure controller. Following the pressure controller, the syngas was sent to a Pfeiffer OMNISTAR mass spectrometer. Alternatively, the syngas was occasionally sampled just before the pressure controller in order to check mass spectrometer results with gas chromatography. All experiments were semi-continuous, meaning that there was a set amount of coal and catalyst loaded into the reactor and then there was a continuous flow of steam into the reactor. As a result, by the end of a run, the coal was mostly consumed, and the main gas species in the pre-quenched syngas was just the water being continuously added. The composition of unconverted water in the syngas was not measured because there were two liquid condensers before the mass spectrometer.

The flow rate of syngas was determined by adding in a known amount of argon (10 sccm) throughout the experiment. For all experiments, Pittsburgh #8 coal (100 mesh) was utilized. In some experiments, fresh coal was used while in others devolitalized coal was used. Devolatization of coal was performed at 700° C. for 4 hours in an argon atmosphere. After devolatilization, the coal was ground down to approximately 20 mesh. The devolitalized coal was then mixed with the alkali hydroxide MOH and devolitalized a second time before the experiment began. This devolitalization process was used in order to determine steam-carbon gasification reaction rates and to quantify the non-volatile methane production.

For all experiments, the coal and the alkali hydroxide MOH was added dry such that there was a 1:1 molar ratio between carbon in the coal and the alkali species. Equimolar amounts of Li, Na, and K were used, generating a ratio of elements on a mol-basis of C:Li:Na:K=3:1:1:1. The elemental analysis of the coal by dry-wt % was C=83.2%, H=5.3%, 0=8.8%, S=2.2%. On an ash-free, dry mol-basis, this is: 54% C, 41% H, 4.3% 0, and 0.5% S. For the devolatized coal, a proximate analysis was used to determine the carbon remaining in the coal.

Figure 2:
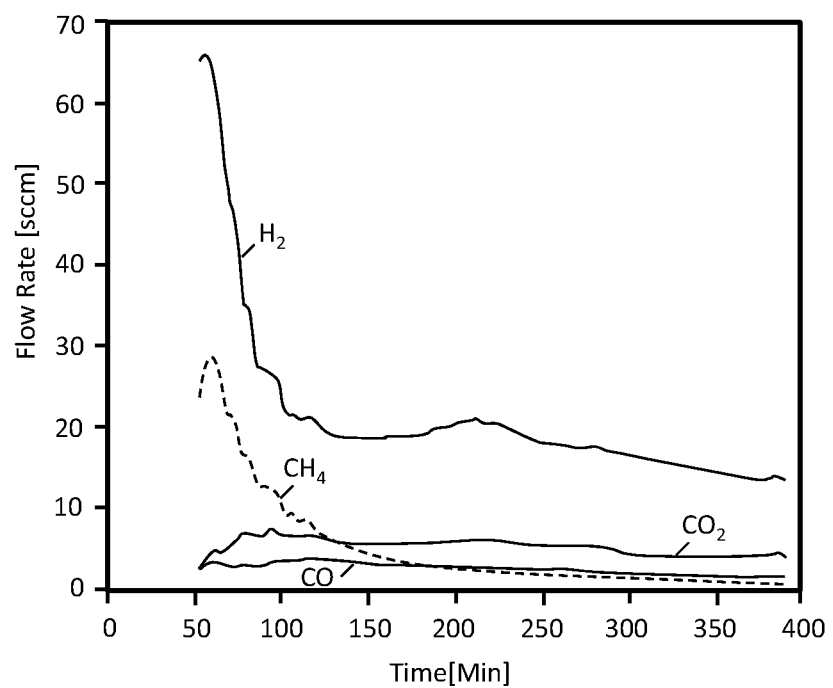
FIG. 2 illustrates $H_2$ and $CH_4$ production using the gasification mixture with a carbonaceous fuel of coal.

FIG. 2 shows the exhaust gas flow rate of $H_2$ and $CH_4$ from gasification of 5 g of Pittsburgh #8 coal (100 mesh), 2.77 g of LiOH, 4.6 g of NaOH, and 6.46 g of KOH at 900° C. and 2.1 MPa (300 psig). There was an approximate 50 minutes delay in data collection because of the time required to pressurize and heat the vessel from pure argon at ambient conditions to 2.1 MPa (300 psig) and 900° C. After the first data point, there was an overall decrease in the total flow rate of syngas as time increased because the amount of coal in the reactor was slowly consumed. The methane and ethane concentration decreased rapidly for several reasons: 1) the amount of coal was decreased with time, 2) the effective pressure decreased as the inert gas (argon) increased in composition, 3) the concentration of steam increased with time, and 4) the coal pyrolysis reactions mostly occur only at the beginning of a batch run.

Figure 3:
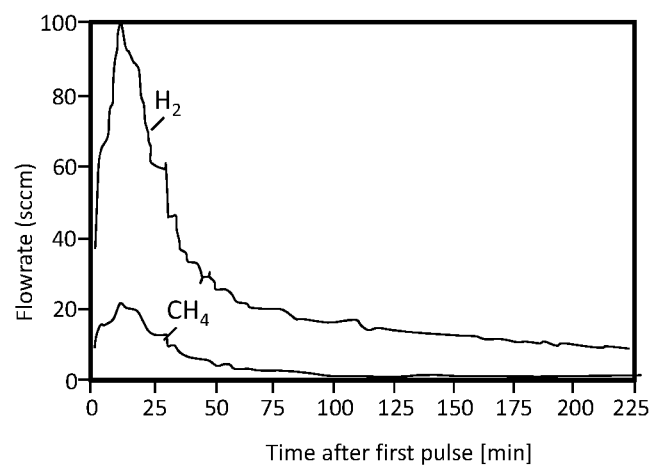
FIG. 3 illustrates $H_2$ and $CH_4$ production with a carbonaceous fuel of coal in the presence of the alkali hydroxide MOH under the molar relations of the gasification mixture.
Figure 4:
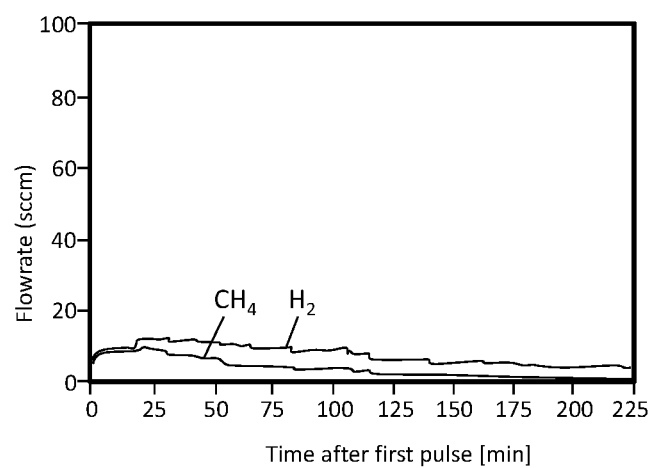
FIG. 4 illustrates $H_2$ and $CH_4$ production with a carbonaceous fuel of coal in the absence of the alkali hydroxide MOH.

FIGS. 3 and 4 show the difference in reaction rates for coal with or without alkali hydroxide MOH when the reactor pressure and temperature are the same: 2.1 MPa and 700° C. FIG. 3 illustrates the reaction rates with the alkali hydroxide MOH while FIG. 4 illustrates reaction rates in the absence of the alkali hydroxide MOH. There was an obvious increase in the reaction rates with the alkali hydroxide MOH, as seen by the significant increase in the production of $H_2$ and $CH_4$ when alkali hydroxide MOH was included with the coal. The production-averaged, dry gas composition in the case with the alkali hydroxide MOH was approximately 80% $H_2$ and approximately 20% $CH_4$. This gas composition is only possible if there is significant capture of $CO_2$ inside the gasifier.

Table 1 shows the production-averaged, syngas composition from the molten catalytic gasifier as a function of temperature of the reactor when the pressure was held constant at 2.1 MPa. Production-averaged means that the total amount of species 'x' produced during the experiment divided by the total amount of syngas during the experiment. The highest average methane composition achieved was 18% while at the same time producing 2.5% ethane+ethylene. It was not possible to accurately differentiate between ethane and ethylene in the mass spectrometer, so the values presented are the sum of ethane plus ethylene. By adding the methane plus twice the ethane/ethylene, this gives an equivalent amount of methane of 23%. The optimal methane composition was obtained at 800° C. and 2.1 MPa. The largest rate of total syngas formation occurred at 900° C. There is a significant amount of $H_2S$ capture inside of the gasifier, because the production-averaged composition of $H_2S$ without alkali hydroxide MOH addition was on the order of 2000 ppm (at 700° C.), while the production-averaged composition of $H_2S$ in the presence of the alkali hydroxide MOH was on the order of 100-600 ppm.

Using an Arrhenius plot and the data for kinetic rates versus temperature, the activation energy barrier for molten alkali catalyzed gasification of fresh Pittsburgh #8 coal with steam was found to be approximately of 59 kJ/mol. The amount of $CO_2$ and CO, as well as $H_2S$ and $C_6H_6$ to a lesser extent, increased with increasing temperatures, whereas the methane and ethane composition were relatively independent of temperature. The reason why the methane and ethane composition do not decrease with increasing temperature, as one would initially expect from thermodynamic arguments, is that, at higher temperatures, there is less steam available to reform the methane and ethane into CO and $H_2$, because of the higher kinetic rates of steam-coal gasification. As a result, Le Chatelier's principle would predict less methane and ethane at higher temperature, but Le Chatelier's principle would also predict more methane and ethane as the steam is consumed. The two effects seemingly cancel with each other, and there is very little change in the methane and ethane composition as temperature in the reactor increased.

Table 2 illustrates the syngas composition, as well as the kinetic rates of steam-coal gasification, as a function of pressure of the vessel, when the temperature was held constant at 700° C. As expected there was an increase in the methane concentration as the pressure was increased. In this set of experiments, the coal was pyrolyzed before using it in the reactor in order to rule out any change in the amount of pyrolysis gases as a function of pressure. The results at Table 2 confirm predicted larger amounts of methane at higher pressures. The increased pressure also had a positive effect on the reaction rates.

Thus, the process as disclosed here provides a gasification process for the production of a methane-rich syngas at temperatures exceeding 700° C. through the use of an alkali hydroxide MOH, using a gasification mixture comprised of at least 0.25 moles and less than 2 moles of water for each mole of carbon, and at least 0.15 moles and less than 2 moles of alkali hydroxide MOH for each mole of carbon. Preferably, the gasification mixture is comprised of at least 0.5 moles and less than 1.5 moles of alkali hydroxide MOH for each mole of carbon. These relative amounts allow the production of a methane-rich syngas at temperatures exceeding 700° C. by enabling a series of reactions which generate $H_2$ and $CH_4$, and mitigate the reforming of methane. The alkali hydroxide MOH and subsequently formed alkali carbonate $M_2CO_3$ act to catalyze the carbon-steam reaction of reaction, and the alkali hydroxide MOH in the molten state acts to remove to some portion of $CO_2$ and form molten alkali carbonate $M_2CO_3$. The specified molar relations limit the alkali hydroxide MOH and $H_2O$ actions to maintain a concentration of CO and $H_2O$ such that reverse methanation is greatly mitigated, and a methane-rich syngas comprised of roughly 20% (dry molar percentage) $CH_4$ at temperatures above 700° C. results. The gasification process disclosed may effectively operate within an IGFC cycle at temperatures between 700-900° C. and pressures in excess of 5 atmospheres.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

TABLE 1:

Product-Average Syngas Composition [%] and Steam-Coal Gasification Rate [1/hr]

|  | $CO_2$ | $CH_4$ | $H_2$ | CO | $H_2S$ | $C_2HC$ | $C_6H_6$ | Rate |
|---|---|---|---|---|---|---|---|---|
| 600° C. | 1.4 | 13 | 82 | 1.2 | <0.01 | 2.6 | 0.2 | 0.12 |
| 700° C. | 7 | 13 | 76 | 2.2 | 0.02 | 2.0 | 0.06 | 0.35 |
| 800° C. | 7.7 | 18 | 70 | 2.6 | 0.06 | 2.5 | 0.05 | 0.73 |
| 900° C. | 1.1 | 15 | 67 | 4 | 0.04 | 2.1 | 0.07 | 0.93 |

TABLE 2

Product-Average Syngas Composition [% vol] and Rate [1/hr]

|  | $CO_2$ | $CH_4$ | $H_2$ | CO | Rate |
|---|---|---|---|---|---|
| 0.38 MPa | 0.03 | 3.7 | 94.9 | 1.1 | 0.28 |
| 0.74 MPa | 0.7 | 6.4 | 91.6 | 1.3 | 0.35 |
| 1.83 MPa | 1.7 | 17.1 | 78.2 | 3.3 | 0.98 |

What is claimed is:

1. A method for the production of a methane-rich syngas comprising:
   generating a slurry, where the slurry is comprised of a carbonaceous fuel, water, and an alkali hydroxide MOH, where M is an alkali metal cation of K, Na, Li, Rb, Cs or mixtures thereof, and where the slurry is comprised of at least 0.25 moles and less than 2 moles of the water for each mole of carbon, and where the slurry is comprised of at least 0.15 moles and less than 2 moles of alkali hydroxide MOH for each mole of carbon, and where the slurry is at a slurry temperature such that the water is in the liquid phase;
   transferring the slurry to a gasification zone and subjecting the slurry to a gasification temperature and a gasification pressure, where the gasification temperature is at least 700° C., and where the gasification temperature is greater than the molten temperature of a molten carbonate $M_2CO_3$, thereby generating gasification gases comprised of $H_2$ and $CH_4$ and thereby generating the molten alkali carbonate $M_2CO_3$; and
   separating at least some portion of the gasification gases from the molten alkali carbonate $M_2CO_3$, thereby generating the methane-rich syngas, where the methane-rich syngas is the at least some portion of the gasification gases.

2. The method of claim 1 where the gasification pressure is at least 10 atmospheres.

3. The method of claim 2 where the alkali hydroxide MOH is at least 5 mol % KOH, and where the slurry is comprised of at least 0.5 moles and less than 1.5 moles of alkali hydroxide MOH for each mole of carbon.

4. The method of claim 3 where the carbonaceous fuel is coal, and where the gasification temperature is less than 900° C., and where the methane-rich syngas is comprised of at least 15 vol % $CH_4$ and less than 10 vol % $CO_2$.

5. The method of claim 3 where for each 1 mole of KOH the alkali hydroxide is comprised of between 0.9 and 1.1 mole of NaOH and between 0.9 and 1.1 mole of LiOH.

6. The method of claim 5 where the carbonaceous fuel is coal, and the gasification temperature is less than 900° C., and the gasification pressure is at least 20 atmospheres.

7. The method of claim 1 where subjecting the slurry to the gasification temperature and the gasification pressure occurs in a co-current gasification zone, and where separating at least some portion of the gasification gases from the molten alkali carbonate $M_2CO_3$ occurs in a separation vessel through buoyancy and gravity effects on the at least some portion of the gasification gases and the molten alkali carbonate $M_2CO_3$.

8. The method of claim 2 further comprised of transferring the methane-rich syngas to the anode of a high temperature fuel cell, such as a solid oxide fuel cell.

9. The method of claim 8 where subjecting the slurry to the gasification temperature and the gasification pressure occurs in a reaction zone, and further comprised of transferring heat or gas or a combination thereof from the anode tail-gas of the solid oxide fuel cell to the reaction zone.

10. A method for the production of a methane-rich syngas comprising:
    generating a mixture comprised of coal, water, and an alkali hydroxide MOH, where M is an alkali metal cation of K, Na, Li, or mixtures thereof, where the alkali hydroxide MOH is at least 5 mol % KOH, where for each 1 mole of KOH the alkali hydroxide is comprised of between 0.9 and 1.1 mole of NaOH and between 0.9 and 1.1 mole of LiOH, and where the mixture is comprised of at least 0.25 moles and less than 2 moles of the water for each mole of carbon, and where the mixture is comprised of at least 0.15 moles and less than 2 moles of alkali hydroxide MOH for each mole of carbon;
    subjecting the mixture to a gasification temperature and a gasification pressure, where the gasification temperature is at least 700° C. and less than 900° C., and where the gasification temperature is greater than the molten temperature of a molten carbonate $M_2CO_3$, and where the gasification pressure is at least 10 atmospheres, thereby generating gasification gases comprised of $H_2$ and $CH_4$ and thereby generating the molten alkali carbonate $M_2CO_3$; and
    separating at least some portion of the gasification gases from the molten alkali carbonate $M_2CO_3$ and withdrawing the methane-rich syngas, where the methane-rich syngas is comprised of at least 15 vol % $CH_4$ and less than 10 vol % $CO_2$, thereby generating the methane-rich syngas, where the methane-rich syngas is the at least some portion of the gasification gases.

11. The method of claim 10 where the gasification pressure is at least 20 atmospheres.

12. The method of claim 11 where generating the generating the mixture comprised of the carbonaceous fuel, the water, and the alkali hydroxide MOH is comprised of:
    generating a slurry, where the slurry is comprised of the coal, the water, and the alkali hydroxide MOH, and where the slurry is comprised of the at least 0.25 moles and the less than 2 moles water for the each mole of carbon, and where the slurry is comprised of the at least 0.15 moles and the less than 2 moles of the alkali hydroxide MOH for the each mole of carbon, and where the slurry is at a slurry temperature such that the water is in the liquid phase; and
    transferring the slurry to a gasification zone at the gasification temperature and the gasification pressure, and heating the slurry in the co-current gasification zone to the gasification temperature, thereby generating the mixture comprised of the carbonaceous fuel, the water, and the alkali hydroxide MOH.

13. The method of claim 12 where subjecting the mixture to the gasification temperature and the gasification pressure occurs in a co-current gasification zone, and where separating at least some portion of the gasification gases from the molten alkali carbonate $M_2CO_3$ occurs in a separation vessel through buoyancy and gravity effects on the at least some portion of the gasification gases and the molten alkali carbonate $M_2CO_3$.

14. The method of claim 13 further comprised of transferring the methane-rich syngas to the anode of a high temperature fuel cell, such as a solid oxide fuel cell.

15. The method of claim 14 further comprised of transferring heat or gas or a combination thereof from the anode tail-gas of the solid oxide fuel cell to the co-current reaction zone.

16. A method for the production of a methane-rich syngas comprising:
    generating a slurry, where the slurry is comprised of coal, liquid water, and an alkali hydroxide MOH, where the alkali hydroxide MOH is comprised of KOH, NaOH, and LiOH, and where for each 1 mole of KOH the alkali hydroxide MOH is comprised of between 0.9 and 1.1 mole of NaOH and between 0.9 and 1.1 mole of LiOH, and where the mixture is comprised of at least 0.25 moles and less than 2 moles of the liquid water for each mole of carbon, and where the mixture is comprised of at least 0.5 moles and less than 1.5 moles of alkali hydroxide MOH for the each mole of carbon, and where the slurry is at a slurry temperature such that the water is in the liquid phase;
    transferring the slurry to a co-current gasification zone at a gasification temperature and a gasification pressure, where the gasification temperature is at least 700° C. and less than 900° C., and where the gasification temperature is greater than the molten temperature of a molten carbonate $M_2CO_3$, and where the gasification pressure is at least 20 atmospheres, and heating the slurry in the gasification zone to the gasification temperature, thereby generating gasification gases comprised of $H_2$ and $CH_4$ and thereby generating the molten alkali carbonate $M_2CO_3$; and
    discharging the gasification gases and the molten carbonate $M_2CO_3$ to a separation vessel in fluid communication with the co-current gasification zone, and separating at least some portion of the gasification gases from the molten alkali carbonate $M_2CO_3$ in the separation vessel through buoyancy and gravity effects on the at least some portion of the gasification gases and the molten alkali carbonate $M_2CO_3$, thereby generating the methane-rich syngas, where the methane-rich syngas is the at least some portion of the gasification gases, and where the methane-rich syngas is comprised of at least 15 vol % $CH_4$ and less than 10 vol % $CO_2$.

17. The method of claim 16 further comprised of transferring the methane-rich syngas to the anode of a high temperature fuel cell, such as a solid oxide fuel cell.

18. The method of claim 17 further comprised of transferring heat or gas or a combination thereof from the anode tail gas of the solid oxide fuel cell to the co-current reaction zone.

* * * * *